US009840855B2

(12) United States Patent
Lin

(10) Patent No.: US 9,840,855 B2
(45) Date of Patent: Dec. 12, 2017

(54) BICYCLE PARKING LOCK APPARATUS AND METHOD FOR OPERATING SAME

(71) Applicant: Mark Lin, Taipei (TW)

(72) Inventor: Mark Lin, Taipei (TW)

(*) Notice: Subject to any disclaimer, the term of this patent is extended or adjusted under 35 U.S.C. 154(b) by 0 days.

(21) Appl. No.: 15/494,627

(22) Filed: Apr. 24, 2017

(65) Prior Publication Data

US 2017/0306656 A1  Oct. 26, 2017

(30) Foreign Application Priority Data

Apr. 26, 2016  (CN) .......................... 2016 1 0262091

(51) Int. Cl.
| E05B 71/00 | (2006.01) |
| B62H 5/10 | (2006.01) |
| B62H 3/10 | (2006.01) |
| E05B 47/00 | (2006.01) |
| B62H 3/00 | (2006.01) |

(52) U.S. Cl.
CPC ............... *E05B 71/00* (2013.01); *B62H 3/10* (2013.01); *B62H 5/10* (2013.01); *E05B 47/0012* (2013.01); *B62H 3/00* (2013.01); *Y10T 70/5885* (2015.04)

(58) Field of Classification Search
CPC ....... E05B 71/00; E05B 47/0012; B62H 5/10; B62H 3/10; B62H 5/12; B62H 3/00; B62H 2003/005; B62H 3/04; B62H 3/08; A47F 7/00; B60R 9/00; Y10T 70/5885
USPC ..... 70/62, 233–236; 211/5, 17–24, 26, 26.1, 211/26.2; 224/536, 537, 924, 935
See application file for complete search history.

(56) References Cited

U.S. PATENT DOCUMENTS

| 568,855 A | * | 10/1896 | Kennedy | .................. | B62H 3/00 |
| | | | | | 211/22 |
| 3,712,637 A | * | 1/1973 | Townsend | ................ | B62H 3/00 |
| | | | | | 280/293 |
| 3,739,609 A | * | 6/1973 | Kaufmann | .............. | E05B 71/00 |
| | | | | | 211/5 |
| 3,865,245 A | * | 2/1975 | Lieb | ......................... | B62H 3/10 |
| | | | | | 211/5 |
| 3,865,246 A | * | 2/1975 | Lieb | ........................ | E05B 71/00 |
| | | | | | 211/5 |
| 4,126,228 A | * | 11/1978 | Bala | ......................... | B62H 3/08 |
| | | | | | 211/22 |

(Continued)

FOREIGN PATENT DOCUMENTS

| DE | 195 37 078 | 10/1995 |
| TW | M474682 | 3/2014 |
| TW | I498247 | 9/2015 |

OTHER PUBLICATIONS

Taiwan Search Report for Application No. 105131010.

*Primary Examiner* — Lloyd A Gall
(74) *Attorney, Agent, or Firm* — Jackson IPG PLLC; Demian K. Jackson

(57) ABSTRACT

The present invention relates to a bicycle parking lock apparatus adapted for locking a crank of the bicycle. The apparatus includes a primary lock part and a secondary lock part movable reciprocatingly relative to the primary lock part. The primary lock part defines a recess adapted to receive the crank. The recess is provided with a sidewall such that when the crank is received in the recess, an outboard side of the crank at a first end thereof is shielded by the sidewall. The secondary lock part is adapted to hold the crank in position in cooperation with the primary lock part.

9 Claims, 18 Drawing Sheets

(56) References Cited

U.S. PATENT DOCUMENTS

| | | | | |
|---|---|---|---|---|
| 5,025,932 A * | 6/1991 | Jay | B60R 9/048 | 211/20 |
| 5,244,101 A | 9/1993 | Palmer et al. | | |
| 5,278,538 A * | 1/1994 | Ainsworth | B62H 3/04 | 180/287 |
| 5,337,587 A * | 8/1994 | Davidson | B62H 5/001 | 280/279 |
| 5,553,715 A * | 9/1996 | Brotz | B62H 3/00 | 211/17 |
| 5,699,684 A * | 12/1997 | Sulin | B62H 3/00 | 211/5 |
| 5,730,012 A * | 3/1998 | Link | B62H 5/12 | 28/259 |
| 5,813,259 A * | 9/1998 | Martin | B62H 3/00 | 211/5 |
| 5,820,002 A * | 10/1998 | Allen | B60R 9/10 | 211/70 |
| 5,983,685 A * | 11/1999 | Garnsworthy | B62H 3/00 | 211/8 |
| 5,984,111 A * | 11/1999 | Pennella | B62H 3/00 | 211/19 |
| 6,027,133 A * | 2/2000 | Phillips | B62H 3/10 | 248/346.03 |
| 6,626,340 B1 * | 9/2003 | Burgess | B60R 9/048 | 224/323 |
| 7,575,207 B2 * | 8/2009 | Chuang | B62H 1/02 | 248/168 |
| 7,631,525 B1 * | 12/2009 | Kennealy | B62H 5/141 | 70/227 |
| 2003/0010074 A1 * | 1/2003 | Pershall | B62H 3/00 | 70/234 |
| 2005/0262909 A1 * | 12/2005 | Brooks | B62H 3/08 | 70/227 |
| 2006/0081025 A1 * | 4/2006 | Smith | B60R 25/093 | 70/226 |
| 2009/0178446 A1 * | 7/2009 | Patterson | B62H 3/04 | 70/259 |
| 2010/0089846 A1 * | 4/2010 | Navarro Ruiz | B60L 11/1833 | 211/4 |
| 2010/0178140 A1 | 7/2010 | Chang | | |
| 2014/0311996 A1 * | 10/2014 | Oviatt | B62H 3/02 | 211/5 |
| 2017/0036721 A1 * | 2/2017 | Rinne | B62H 3/00 | |

* cited by examiner

BICYCLE PARKING LOCK APPARATUS AND METHOD FOR OPERATING SAME

CROSS REFERENCE TO RELATED APPLICATIONS

This application claims priority to Chinese Patent Application No. 201610262091.5 filed Apr. 26, 2016, which is hereby incorporated by reference in its entirety.

FIELD OF THE INVENTION

The present invention relates to an apparatus for parking and locking a bicycle, more particularly to a bicycle parking lock apparatus adapted for locking a crank of a bicycle. The present invention also relates to a method for operating the bicycle parking lock apparatus.

DESCRIPTION OF THE RELATED ART

With the progress of society, traffic pressure in cities also increases, making travelling in cities inconvenient. Bicycles have therefore become a preferred form of transportation for short-distance travels or trips. Travelling by bicycle not only can avoid congested areas to thereby alleviate traffic pressure in cities, it is a low-carbon form of transportation and is eco-friendly. Moreover, bicycle riding is good exercise. The most common types of bicycles include road bicycles, mountain bicycles, small-wheel bicycles, folding bicycles, step-through bicycles, city bicycles, etc. Bicycles may cost from about US$100 to about US$10,000, depending on the material, performance, accessories, and use thereof.

Although travelling by bicycle provides many benefits, it is still not a very popular form of transportation. One main reason is that people have concerns about safe bicycle parking. At present, when a cyclist parks his/her bicycle, a padlock is generally used to lock a bicycle wheel to the bicycle frame to prevent turning of the bicycle wheel, or to secure the bicycle frame or wheel to a fixed object, such as a lamp post, railings or a utility pole. However, the level of security such ways of locking can provide is extremely low since thieves can steal bicycles or bicycle parts within a very short time by breaking the locks or detaching the bicycle wheels. Therefore, many bicycle owners simply leave their bicycles at home and do not put them to effective use.

Due to the gravity of the problem of safe bicycle parking and the lack of adequate bicycle parking to meet market demands, the industry has devised various solutions. For example, Taiwanese Patent No. 1498247 discloses a bicycle locking system, which involves providing a locking slot in a parking rack structure fixedly mounted on the ground for receiving a matching locking device installed at a front wheel axle of a bicycle such that when the bicycle is pushed into the parking rack structure, the bicycle is locked at the front wheel axle. Taiwanese Patent No. M474682 discloses another bicycle parking lock system, which involves providing a locking slot in a parking stand fixedly mounted on the ground for receiving a matching identification element installed at the stem and the handlebar of a bicycle such that the bicycle can be locked to the parking stand at the stem and the handlebar. However, since the frame height and wheel diameter vary for different types of bicycles, there is a limitation in terms of the types of bicycles that can utilize the aforementioned bicycle parking lock systems which use the wheel axle or the handlebar as a locking point. Furthermore, the structure of the bicycle has to be provided with additional locking parts, such that the bicycle can be secured to the aforementioned parking lock systems. Moreover, thieves can still remove the wheel or handlebar to steal such major parts as frames and derailleurs. In addition, since such conventional parking locks are generally fixed structures jutting out from the ground and occupy large areas of public spaces, they will need to compete with other vehicles like cars and motorcycles in parking space planning. This is particularly disadvantageous in densely populated land-scarce modern cities.

Therefore, there is still a need in the relevant art for a secure and reliable bicycle locking solution that can accommodate most types of bicycles and does not require modifying the bicycle structure.

SUMMARY OF THE INVENTION

The inventor has conducted extensive research regarding the problems in the relevant industry, and has noted that, of all of the components of a bicycle, the cranks which serve as the main transmission of the bicycle and connect the pedals and the crankshafts do not vary extensively for different bicycle types in terms of mounting position, external configuration, and size. In addition, since the cranks are located substantially at the central position of the entire bicycle frame, they are the parts of the bicycle that are suitable for being locked when the bicycle is parked. Therefore, in the first aspect provided herein is a bicycle parking lock apparatus adapted for locking a crank of a bicycle, wherein the crank includes a crank body, a first end portion connected to a crankshaft, and a second end portion connected to a pedal such that the crank has, relative to a bicycle frame of the bicycle, an inboard side facing the bicycle frame, and an outboard side distal from the bicycle frame. The bicycle parking lock apparatus comprises:

a primary lock part having a free end, a restrained end opposite to the free end, and a recess distal from the restrained end and adapted to receive the crank, wherein the recess is provided with a sidewall such that when the crank is received in the recess, the outboard side of the crank at the first end portion is shielded by the sidewall; and a secondary lock part configured to be movable reciprocatingly relative to the primary lock part to be disposed in a standby position or a locked position, wherein when the secondary lock part is driven to be disposed in the locked position thereof, the secondary lock part is adapted to hold the crank in position in cooperation with the primary lock part.

In a preferred embodiment, the secondary lock part is configured to be movable reciprocatingly along a direction substantially parallel to the sidewall, and is spaced apart from the sidewall by a distance sufficient to accommodate the crank between the secondary lock part and the sidewall such that when the crank is received in the recess, the secondary lock part is adapted to hold the crank body of the crank in position.

In a preferred embodiment, the secondary lock part is disposed on the primary lock part such that the secondary lock part is arranged substantially parallel to and opposite to the sidewall with respect to the recess, and is spaced apart from the sidewall by a horizontal distance sufficient to accommodate the crank.

In the second aspect provided herein, the bicycle parking lock apparatus further comprises a mount body, which has a work surface and a mounting frame connected below the work surface, wherein:

the primary lock part is slidably disposed on the mounting frame through the restrained end such that the primary lock part is movable reciprocatingly along a longitudinal direction substantially perpendicular to the work surface, and the primary lock part includes a front abutment surface distal from the restrained end and adapted to be abutted against by the crank body of the crank, and an extension arm extending from the front abutment surface to define the recess in cooperation with the front abutment surface, the extension arm formed with an abutment portion facing downwards and adapted to receive the first end portion of the crank; and the secondary lock part is configured as a plate body and is disposed on the mounting frame in such a manner as to be movable reciprocatingly along the longitudinal direction, the secondary lock part being formed with a rear plate opposite to the abutment surface, and a side plate connected substantially perpendicularly to the rear plate such that the rear plate and the side plate which are formed on the secondary lock part are adapted to hold the crank in position in cooperation with the recess of the primary lock part.

In a preferred embodiment, the side plate of the secondary lock part is formed with a guide plate at an opposite lateral edge opposite to a lateral edge where the side plate is connected to the rear plate, the guide plate being substantially parallel to the rear plate such that the rear plate, the side plate, and the guide plate cooperatively define a guide groove, the primary lock part being fitted in the guide groove such that the primary lock part is slidable along the longitudinal direction relative to the secondary lock part.

In a preferred embodiment, the bicycle parking lock apparatus according to the second aspect further comprises a primary lock part driving member and a secondary lock part driving member which are disposed in the mounting frame, wherein the primary lock part driving member and the secondary lock part driving member are respectively connected to the primary lock part and the secondary lock part to respectively drive the primary lock part and the secondary lock part to move along the longitudinal direction. More preferably, the primary lock part driving member and the secondary lock part driving member respectively include an electric motor and a linear actuator member driven by the electric motor.

In a more preferred embodiment, the primary lock part is configured to be drivable to move along the longitudinal direction to be disposed in one of a standby position, an unlocked position, and a locked position such that: when the primary lock part is in the standby position thereof, the primary lock part is disposed at a lowest point without projecting upwardly of the work surface; when the primary lock part is in the unlocked position thereof, the primary lock part is disposed at a highest point to enable the abutment portion and the front abutment surface to permit the crank body of the crank to be brought close thereto; and when the primary lock part is in the locked position thereof, the first end portion of the crank is received by the abutment portion. The secondary lock part is configured to be drivable to move along the longitudinal direction to be disposed in one of the standby position thereof and the locked position thereof such that when the secondary lock part is in the standby position thereof, the secondary lock part is disposed at a low point without substantially projecting upwardly of the work surface, and when the secondary lock part is in the locked position thereof, the secondary lock part is disposed at a high point to hold the crank in position in cooperation with the primary lock part.

In a more preferred embodiment, the front abutment surface has a first switch disposed thereon such that when the first switch is activated, the primary lock part is driven to start moving downwardly from the unlocked position thereof. The abutment portion has a second switch disposed thereon such that when the second switch is activated, the primary lock part stops moving downwardly while the secondary lock part is driven to start moving upwardly from the standby position thereof. The secondary lock part has a third switch disposed on an upper end thereof such that when the third switch is activated, the secondary lock part stops moving upwardly.

In a more preferred embodiment, the second switch is provided with a pressure sensor for sensing a force exerted by the primary lock part on the first end portion of the crank such that when the pressure sensor senses that the force reaches a predetermined magnitude, the second switch is activated to cause the primary lock part to stop moving downwardly.

Therefore, in the third aspect provided herein is a method for operating the bicycle parking lock apparatus according to the second aspect, the method comprises:

making the primary lock part and the secondary lock part to be disposed below the work surface and in the standby positions thereof;

driving the primary lock part to move upwardly to the highest point to be disposed in the unlocked position thereof, and rendering the secondary lock part to remain in the standby position thereof so as to expose the recess;

driving the primary lock part to move downwardly to the locked position thereof so as to permit the abutment portion to receive the first end portion of the crank; and driving the secondary lock part to move upwardly to the locked position thereof so as to hold the crank in position in cooperation with the primary lock part.

In a preferred embodiment, when the primary lock part is in the locked position thereof, the primary lock part exerts a downward force on the first end portion of the crank to force the wheels of the bicycle to be brought by the crank to rest tightly against the ground so that the bicycle cannot be freely removed.

BRIEF DESCRIPTION OF THE DRAWINGS

The above and other objects, features and effects of the invention will become apparent with reference to the following description of the preferred embodiments taken in conjunction with the accompanying drawings, wherein like numerals designate similar parts.

DETAILED DESCRIPTION OF THE INVENTION

It should be noted that the indefinite article "a" or "an" as used in the specification and claims is intended to mean one or more than one, such as "at least one," "at least two," or "at least three," and does not merely refer to a singular one. In addition, the term "having/has" as used in each claim is defined as transitional words "including/includes (open language)" or "comprising/comprises (open language)" and do not exclude unrecited additional elements. Unless specified otherwise, the following terms as used in the specification and claims are given the following definitions.

Figure 1:
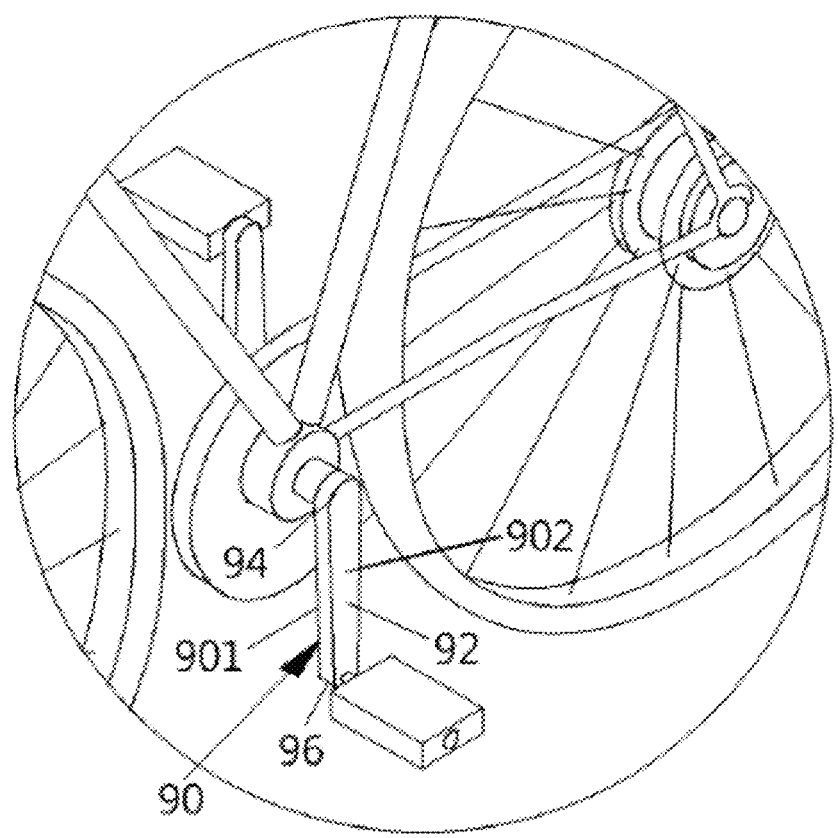
FIG. 1 is a schematic view of a conventional crank structure of a bicycle.

Cranks are the core elements of a bicycle transmission system. The cranks connect the pedals and the crankshafts, and are responsible for providing a force to drive the bicycle forward. The basic function of the transmission system is to transmit a mechanical force, generated as a result of the rider's alternate pedaling of the pedals which drives turning of the cranks, to chain wheels through the crankshafts connected to the cranks and further to the free wheels through the chains. The free wheels then drive the tires to move forward through the hubs and the spokes. The term "cranks" as used herein refers to the lever structures connecting the pedals to the crankshafts in a bicycle. According to the basic structure of a conventional bicycle, two cranks are respectively provided on two sides of the bicycle. One of the cranks is connected not only to the crankshaft thereof, but it is directly connected to a chain wheel on the same side. The other crank is connected to a chain wheel on the other side via the crankshaft thereof to thereby form a structure projecting laterally outward from the bicycle frame. According to actual measurements made by the inventor, there is merely a difference of 4 centimeters for different bicycle types in terms of the distance between the crankshaft and the ground. As such, the cranks of the bicycle are suitable for being locked when the bicycle is parked. Therefore, the term "crank" as referred to herein means the crank on the opposite side of a bicycle relative to the side where the chain wheel resides. As shown in FIG. 1, a bicycle has a crank 90 which includes a crank body 92, a first end portion 94 connected to a crankshaft, and a second end portion 96 connected to a pedal. Based on such connecting relationship, the crank 90 has, relative to a bicycle frame of the bicycle mounted with the crank 90, an inboard side 901 facing the bicycle frame, and an outboard side 902 distal from the bicycle frame. In some embodiments, the first end portion 94 of the crank 90 has a through hole for extension of the crankshaft therethrough. The first end portion 94 may be further provided with additional components, such as a tightening bolt or nut, a dust cover, a pad, etc. The "first end portion" 94 referred to herein also covers such additional components that may change the external profile of the crank 90.

The present invention discloses a bicycle parking lock apparatus adapted for locking a crank of a bicycle. The bicycle parking lock apparatus includes a primary lock part and a secondary lock configured to be movable reciprocatingly relative to the primary lock part. The primary lock part has a free end and a restrained end relative to the free end. The "restrained end" as referred to herein means an end portion of the primary lock part which is directly or indirectly disposed on a fixed object such that the primary lock part can be anchored at a specific location for parking and locking a bicycle. The fixed object may be a ground surface, a wall, or any natural or artificial object that is capable of supporting the invented bicycle parking lock apparatus.

The primary lock part is formed with a recess at a position distal from the restrained end for receiving the crank. The expression "distal from the restrained end" as referred to herein means any position at the free end and between the free end and the restrained end, so long as the position is convenient for the bicycle to approach the recess and allows the crank of the bicycle to be received in the recess. For instance, when the restrained end of the primary lock part is disposed on a wall, the recess may be formed in the free end. In contrast, when the primary lock part is mounted uprightly on the ground, the recess may be formed at a position between the free end and the restrained end. Preferably, a distance between the recess and a bicycle supporting surface is substantially the same as a distance between the crankshaft and the bicycle supporting surface, for example, a distance of about 20 to 30 cm from the bicycle supporting surface. In an embodiment, the recess has an opening formed to be oriented in a horizontal direction so as to permit the crank of the bicycle to be brought close to the recess and be received therein. There is no specific limitation as regards the size and shape of the recess, so long as the first end portion of the crank can be substantially accommodated in the recess when the crank is received in the recess, preferably limiting upward or downward movement of the crank and the bicycle. The recess is further provided with a sidewall such that when the crank is received in the recess, the outboard side of the crank at the first end portion is shielded by the sidewall, thereby protecting a connection between the first end portion and the crankshaft against damage by an external impact. The term "shielded" as used herein is not intended to mean that the first end portion of the crank must be completely isolated from the outside, but rather means that the connection between the first end portion and the crankshaft is not substantially exposed to the outside to be vulnerable to damage by an external impact so as to prevent thieves from stealing the bicycle by detaching the crank from the crankshaft. Certainly, the sidewall itself should be sufficiently robust to withstand an external impact. Preferably, the primary lock part is not provided with an additional sidewall opposite to the aforesaid sidewall with respect to the recess, so that the crank will not be obstructed from entry into the recess due to the presence of the crankshaft.

The secondary lock part is configured to be movable reciprocatingly relative to the primary lock part to be disposed in a standby position or a locked position. When in the locked position, the secondary lock part is adapted to hold the crank in position in cooperation with the primary lock part such that movement of the crank and the bicycle in any direction is limited. In a preferred embodiment, the secondary lock part is configured to be movable reciprocatingly along a direction substantially parallel to the sidewall, and is spaced apart from the sidewall by a distance sufficient to accommodate the crank between the secondary lock part and the sidewall such that when the crank is received in the recess, the secondary lock part can hold a crank body of the crank in position.

The primary lock part and the secondary lock part are preferably formed from a rigid metal material by a known metal processing process such as punching, rolling, compression molding, forging, etc. Since the bicycle parking lock apparatus according to the invention is generally installed outdoors or even embedded in the ground, it must be capable of withstanding attacks of adverse environmental factors, such as temperature, dampness, high acidic or basic conditions, etc. Therefore, the primary lock part and the secondary lock part are preferably formed from a corrosion-resistant metal material that can withstand external adverse environmental factors. Examples of such corrosion-resistant metal material include, but are not limited to, stainless steel, high nickel alloy, high aluminum alloy, titanium alloy, and tungsten alloy.

Figure 2:
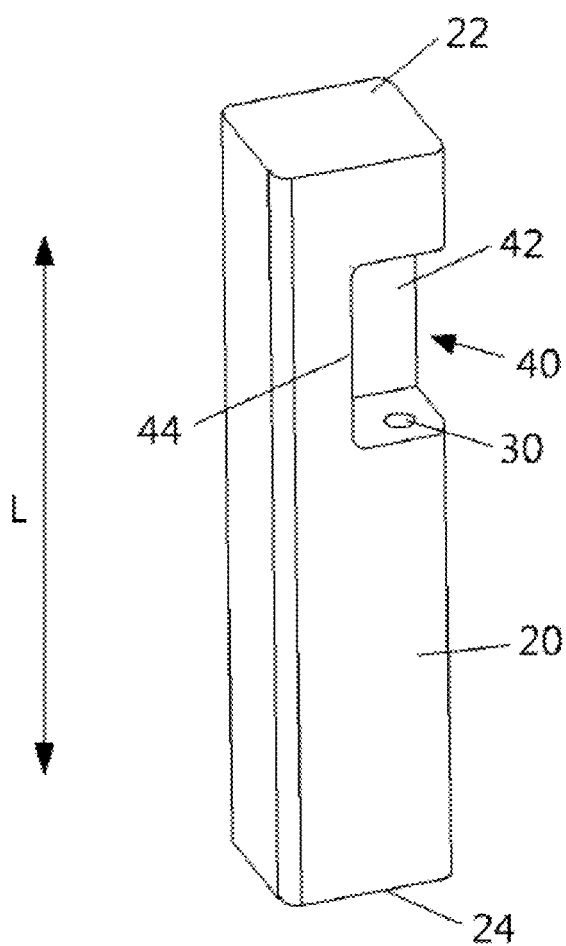
FIG. 2 is a schematic perspective view of a first embodiment of a bicycle parking lock apparatus according to the invention, showing a secondary lock part in a standby position.
Figure 3:
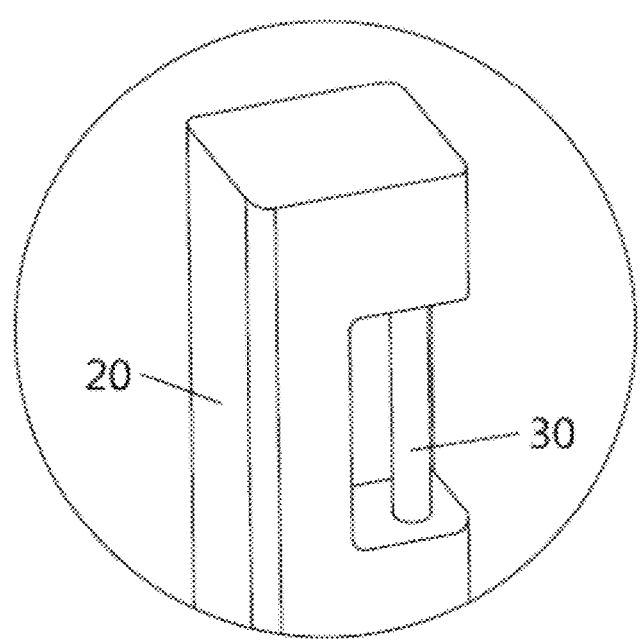
FIG. 3 is another schematic perspective view of the first embodiment according to the invention, showing the secondary lock part in a locked position.

A bicycle parking lock apparatus according to the first embodiment of the invention is shown in FIGS. 2 and 3, and includes a primary lock part 20 and a secondary lock part 30.

As shown in FIG. 2, the primary lock part 20 is configured to be substantially a bar extending along a longitudinal direction (L), and is preferably of a one-piece configuration. The primary lock part 20 has a free end 22 and a restrained end 24, and is adapted for mounting fixedly and uprightly on the ground through the restrained end 24. A recess 40 is formed between the free end 22 and the restrained end 24 at a position proximate to the free end 22 to permit entry of the first end portion 94 of the crank 90 thereinto. The recess 40 is substantially in the form of a rectangular groove with an opening oriented in a horizontal direction so as to permit the first end portion 94 and even a part of a crank body 92 to approach and to be received in the recess 40. In this embodiment, the opening of the recess 40 generally has a wider dimension in the longitudinal direction (L) so as to fit cranks mounted at different heights on different types of bicycles. The recess 40 has an abutment portion 42 opposite to the opening thereof adapted to be abutted against by the first end portion 94. In addition, the recess 40 is provided with a sidewall 44. Preferably, the sidewall 44 extends substantially along the longitudinal direction (L).

The secondary lock part 30 is configured to be substantially in the form of a bar-like locking block. In this embodiment, the secondary lock part 30 is disposed on the primary lock part 20 such that the secondary lock part 30 is movable reciprocatingly relative to the primary lock part 40 along the longitudinal direction (L) so as to be disposed in the standby position as shown in FIG. 2 or the locked position as shown in FIG. 3. In a preferred embodiment, the primary lock part 20 is provided with a guide hole (not shown) extending along the longitudinal direction (L), and the secondary lock part 30 is slidably mounted in the guide hole so as to be guided to move reciprocatingly in the longitudinal direction. The secondary lock part 30 is disposed parallel to the sidewall 44 and on an opposite side of the recess 40, and is spaced apart from the sidewall 44 by a horizontal distance sufficient to accommodate the crank 90. The switching of the secondary lock part 30 between the standby position and the locked position can be implemented by manual or electric control, preferably by electric control. In embodiments where the secondary lock part 30 is controlled electrically, it is preferable that the method of control is similar to that for a conventional electronic lock. In other words, the secondary lock part 30 is generally actuated by a conventional mechanical driving element (not shown), which is in turn connected to a power supply loop for receiving alternating current from a city power source or power supply from a direct current source such as a nickel-hydrogen battery, a lithium battery, and the like, so as to maintain operation thereof.

Figure 4:
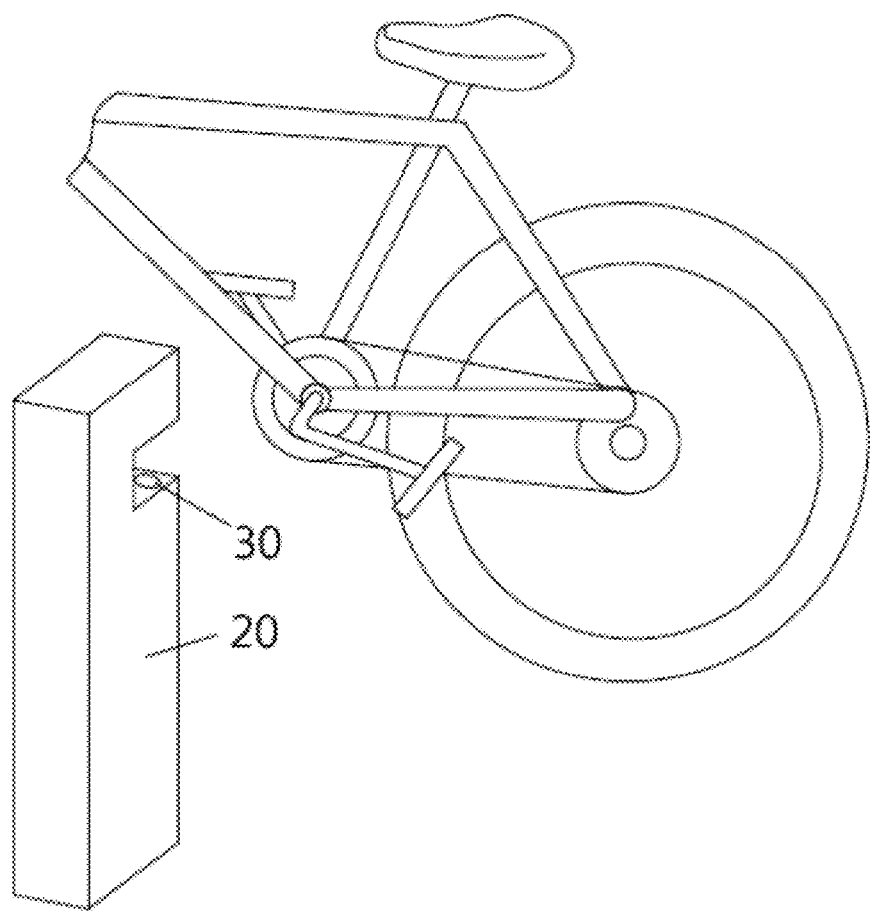
FIG. 4 is a schematic view of the first embodiment according to the invention, showing the bicycle parking lock apparatus in an unlocked state.
Figure 5:
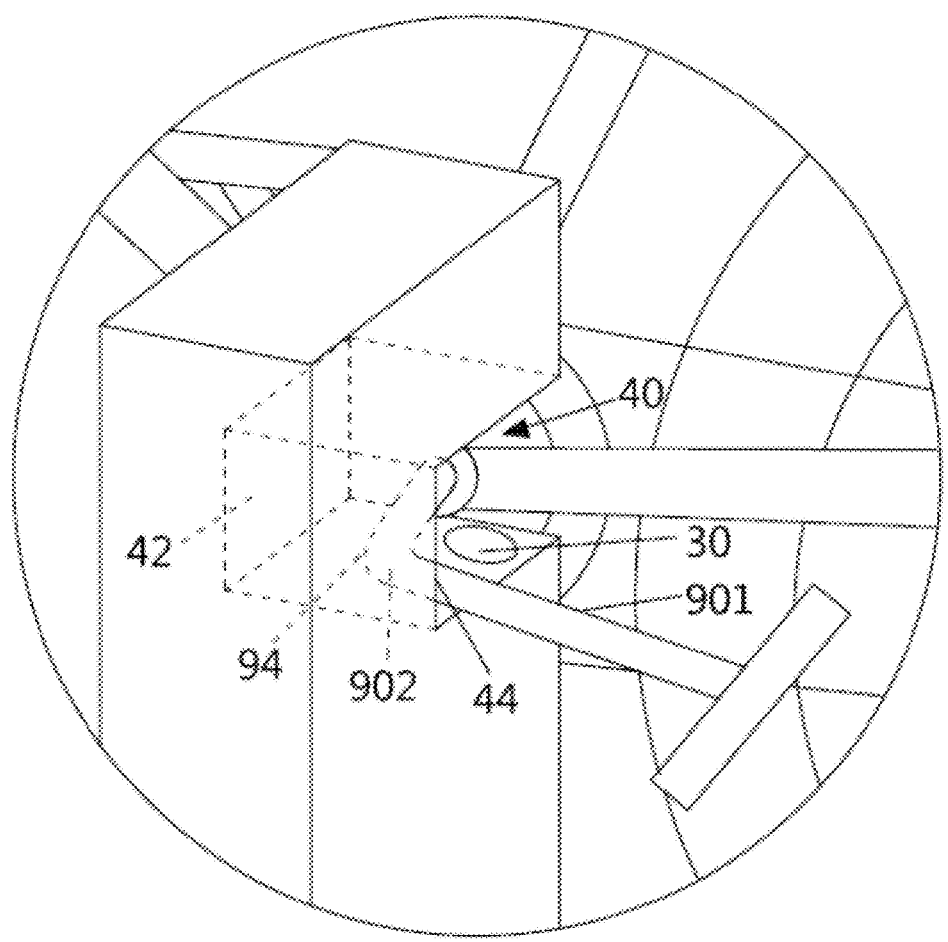
FIG. 5 is a schematic view of the first embodiment according to the invention, showing a crank adjusted to be in a substantially horizontal position to permit a first end portion thereof to enter a recess.
Figure 6:
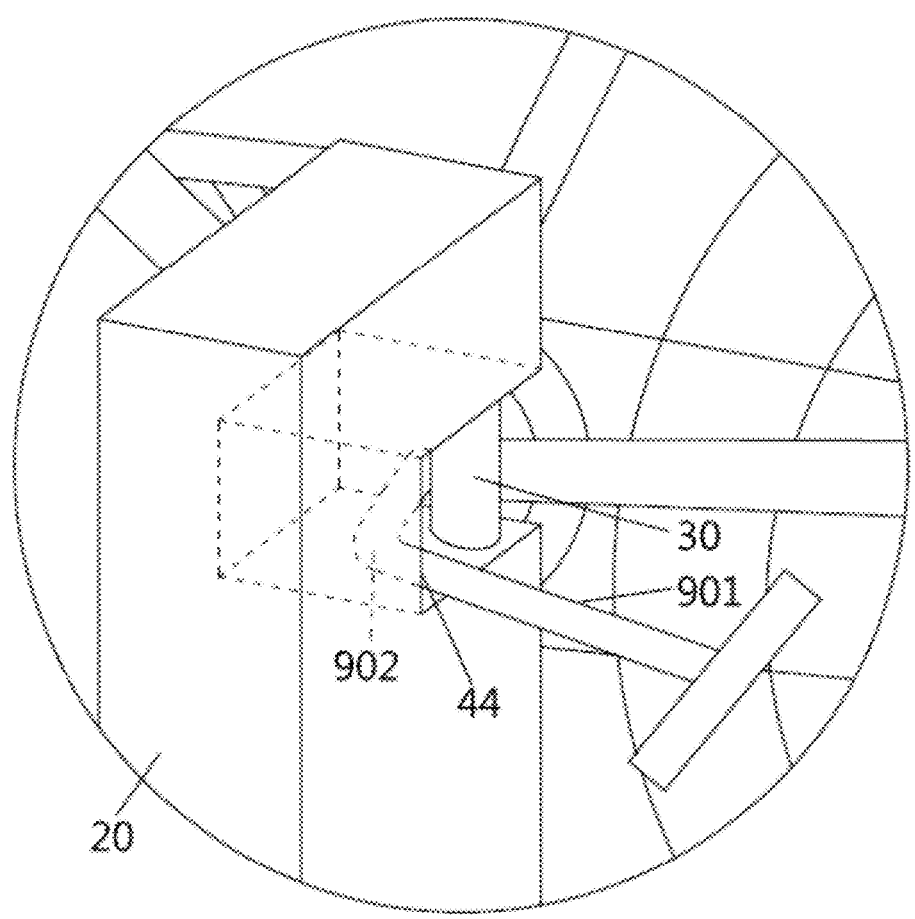
FIG. 6 is a schematic view of the first embodiment according to the invention, showing positions of a primary lock part and the secondary lock part relative to the crank when the bicycle parking lock apparatus is in a locked state.

FIGS. 4 to 6 illustrate the operation of the first embodiment of the bicycle parking lock apparatus according to the invention. As shown in FIG. 4, when the bicycle parking lock apparatus is in an unlocked state, the secondary lock part 30 is located at the standby position. At this time, as shown in FIG. 5, a user may move the pedal of the bicycle to be oriented rearwardly and adjust the crank 90 to be generally horizontal. Then the bicycle can be pushed such that the first end portion 94 of the crank 90 enters into the recess 40 until the first end portion 94 is close to or abuts against the abutment portion 42. At this time, the outboard side 902 of the crank 90 at the first end portion 94 is shielded by the sidewall 44. Subsequently, the secondary lock part 30 is rendered to project outwardly to move from the standby position to the locked position as shown in FIG. 6. In commercial applications, the operation process can be initiated by pressing an activation key or button, inputting a specific number, scanning a barcode, inserting a specific amount of money, or deducting points corresponding to a specific amount of money from a magnetic card. In the locked position, the secondary lock part 30 is located between the crank body 92 and the bicycle frame and holds the crank 90 in position by abutting against the inboard side 901 of the crank 90, thereby limiting lateral movement of the crank and the bicycle. Furthermore, the abutment portion 42 limits forward movement of the crank 90 while the secondary lock part 30 blocks rearward movement of the crankshaft. Thus, the secondary lock part 30 and the primary lock part 20 cooperatively hold the crank 90 in position to thereby limit movement of the crank and the bicycle in any direction.

When the user wants to retrieve the bicycle, the user may cause the secondary lock part 30 to move from the locked position to the standby position by pressing an activation key or button, inputting a specific number, scanning a barcode, inserting a specific amount of money, or deducting points corresponding to a specific amount of money from a magnetic card, and the bicycle parking lock apparatus will return to the unlocked state as shown in FIG. 4.

Figure 7:
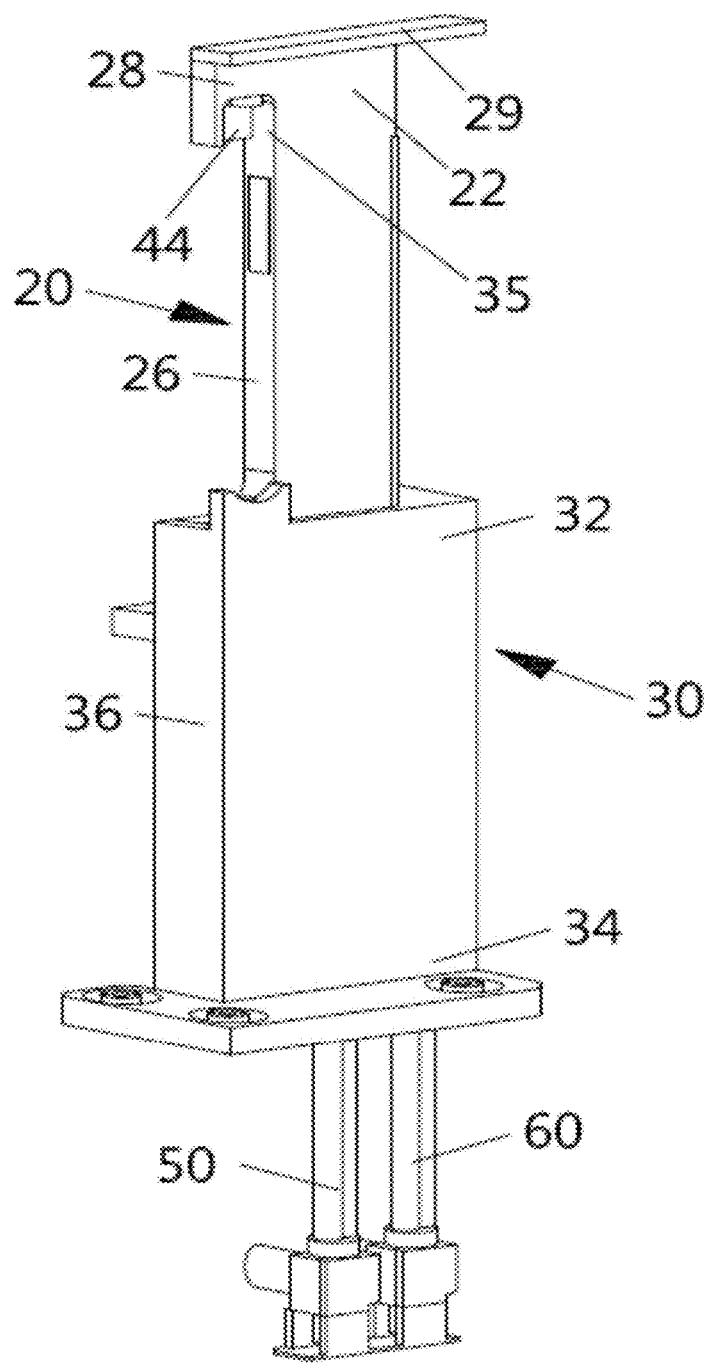
FIG. 7 is a schematic view of a second embodiment of a bicycle parking lock apparatus according to the invention, showing the spatial relationship between primary and secondary lock parts.
Figure 8:
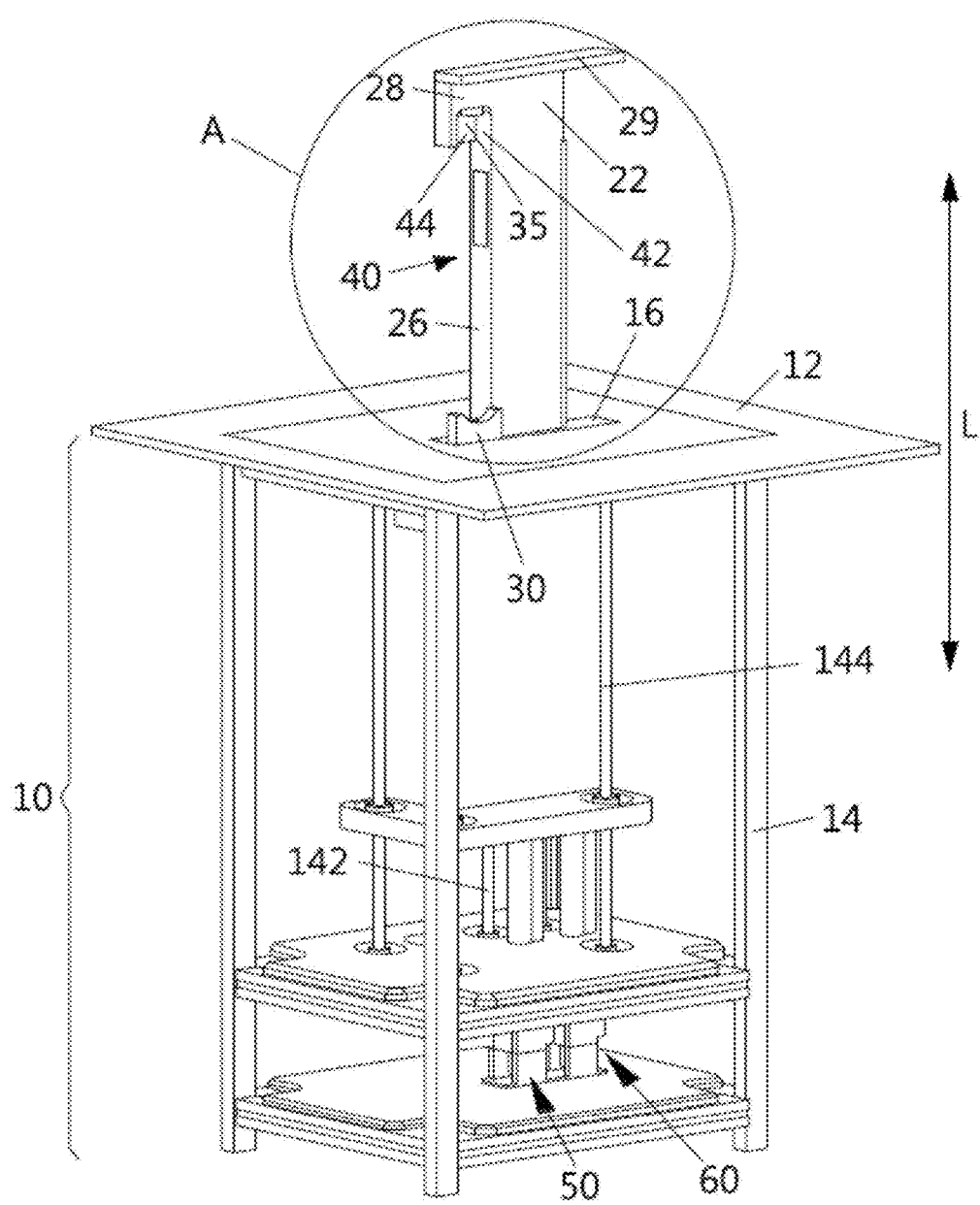
FIG. 8 is a schematic perspective view of the second embodiment according to the invention.

FIGS. 7 and 8 show a second embodiment of a bicycle parking lock apparatus according to the invention, which includes a mount body 10 and the primary and secondary lock parts 20, 30, which are disposed on the mount body 10.

The mount body 10 is a framework used for support and protection, and can be configured as any structure capable of achieving such purpose. In a preferred embodiment, the mount body 10 has a work surface 12 and a mounting frame 14 connected below the work surface 12. The mount body 10 is adapted to be embedded in the ground with the work surface 12 flush with the ground surface. Preferably, the work surface 12 is formed with an opening 16 for upward extension or downward retraction of the primary lock part 20 and the secondary lock part 30 which are disposed on the mount body 10.

The mount body 10 is preferably formed from a rigid metal material by a conventional metal processing process such as punching, rolling, compression molding, forging, etc. Since the mount body 10 is generally installed outdoors and embedded in the ground, preferably, the mount body 10 is formed from a corrosion-resistant metal material that can withstand external adverse environmental factors, and is further covered by a protective outer layer (not shown) made of metal or plastic so as to guard against attacks of external adverse environmental factors. Examples of such corrosion-resistant metal material include, but are not limited to, stainless steel, high-nickel alloy, high-aluminum alloy, titanium alloy, and tungsten alloy.

The primary lock part 20 is configured to be in the form of a bar and is preferably of a one-piece configuration. The primary lock part 20 is disposed on the mounting frame 14 so as to be movable reciprocatingly along a longitudinal direction (L) substantially perpendicular to the work surface 12, and is configured to extend along the longitudinal direction (L). In a preferred embodiment, the mounting frame 14 is provided with one or more guide posts 142 extending along the longitudinal direction (L) for mounting the primary lock part 20 slidably thereon so as to guide the primary lock part 20 to move reciprocatingly along the longitudinal direction (L). Preferably, the primary lock part 20 is in register with the opening 16 so that the primary lock part 20 is extendable upwardly of the work surface 12 and retractable inwardly to below the work surface 12 through the opening 16. The primary lock part 20 has a free end 22, a restrained end 24, and a front abutment surface 26 disposed between the free end 22 and the restrained end 24 adapted to be abutted against by a crank body 92 of the crank 90. The primary lock part 20 is slidably disposed on the mounting frame 14 through the restrained end 24 thereof. Preferably, the front abutment surface 26 is configured to extend parallel to the longitudinal direction such that when the primary lock part 20 extends upwardly to be disposed in an unlocked position to be described hereinafter, the front abutment surface 26 permits the crank body 92 to be brought close thereto and receives at least a part of the crank body 92. Furthermore, the primary lock part 20 is formed with an extension arm 28 extending from the front abutment surface 26 proximate to the free end 22 thereof. Preferably, the extension arm 28 extends from the front abutment surface 26 in a direction substantially perpendicular to the longitudinal direction (L), and defines a recess 40 in cooperation with the front abutment surface 26 for receiving the crank 90. The extension arm 28 has a lower portion formed with an abutment portion 42 facing downwards and adapted to abut against the first end portion 94 of the crank 90 from above. The recess 40 is further formed with a sidewall 44 at the abutment portion 42, and the sidewall 44 preferably extends substantially along the longitudinal direction (L), whereby the abutment portion 42 is configured into a cavity that opens downwardly such that the first end portion 94 can be fully accommodated by the abutment portion 42 when being received by the abutment portion 42. Furthermore, the outboard side 902 of the crank 90 at the first end portion 94 can be shielded by the sidewall 44 to prevent thieves from stealing the bicycle by breaking the connection between the crank 90 and the crankshaft. In a preferred embodiment, the free end 22 is provided with a cover 29. When the primary lock part 20 is disposed in a standby position and located below the work surface 12, the cover 29 can close the opening 16 to prevent entry of foreign objects into the mount body 10.

The secondary lock part 30 is configured substantially as a plate and is preferably of a one-piece configuration. The secondary lock part 30 is disposed on the mounting frame 14 such that the secondary lock part 30 is movable reciprocatingly along the longitudinal direction (L). In a preferred embodiment, the mounting frame 14 is provided with one or more guide posts 144 that extend along the longitudinal direction for mounting the secondary lock part 30 slidably thereon so as to guide the secondary lock part 30 to move reciprocatingly along the longitudinal direction (L). Preferably, the secondary lock part 30 is in register with the opening 16 so that the secondary lock part 30 is extendable upwardly of the work surface 12 and retractable inwardly to below the work surface 12 through the opening 16. The secondary lock part 30 has an upper end 32 and a lower end 34. The secondary lock part 30 includes a side plate 38 arranged to be opposite to the sidewall 44, and a rear plate 36 arranged to be opposite to the front abutment surface 26 and connected substantially perpendicularly to the side plate 38. Preferably, the rear plate 36 and the side plate 38 are configured to extend along the longitudinal direction (L) such that the rear plate 36 and the side plate 38 which are formed on the secondary lock part 30 can be adapted to hold the crank 90 in cooperation with the extension arm 28 and the front abutment surface 26 which are formed on the primary lock part 20 to thereby limit movement of the crank 90 and the bicycle in any direction. In this embodiment, a distance between the front abutment surface 26 and the rear plate 36 and a horizontal distance between the side plate 38 and the sidewall 44 are arranged to be sufficient for accommodating the crank 90, such that the front abutment surface 26 and the rear plate 36 respectively shield front and rear sides of the crank body 92 which respectively face front and rear sides of the bicycle, whereas the side plate 38 is configured to shield the inboard side 901 of the crank 90. Preferably, the secondary lock part 30 is formed at the upper end 32 with a groove 35 having an upward opening such that when the secondary lock part 30 is disposed in a locked position to be described hereinafter, the groove 35 abuts against the crank 90 or the crankshaft from below.

Figure 9:
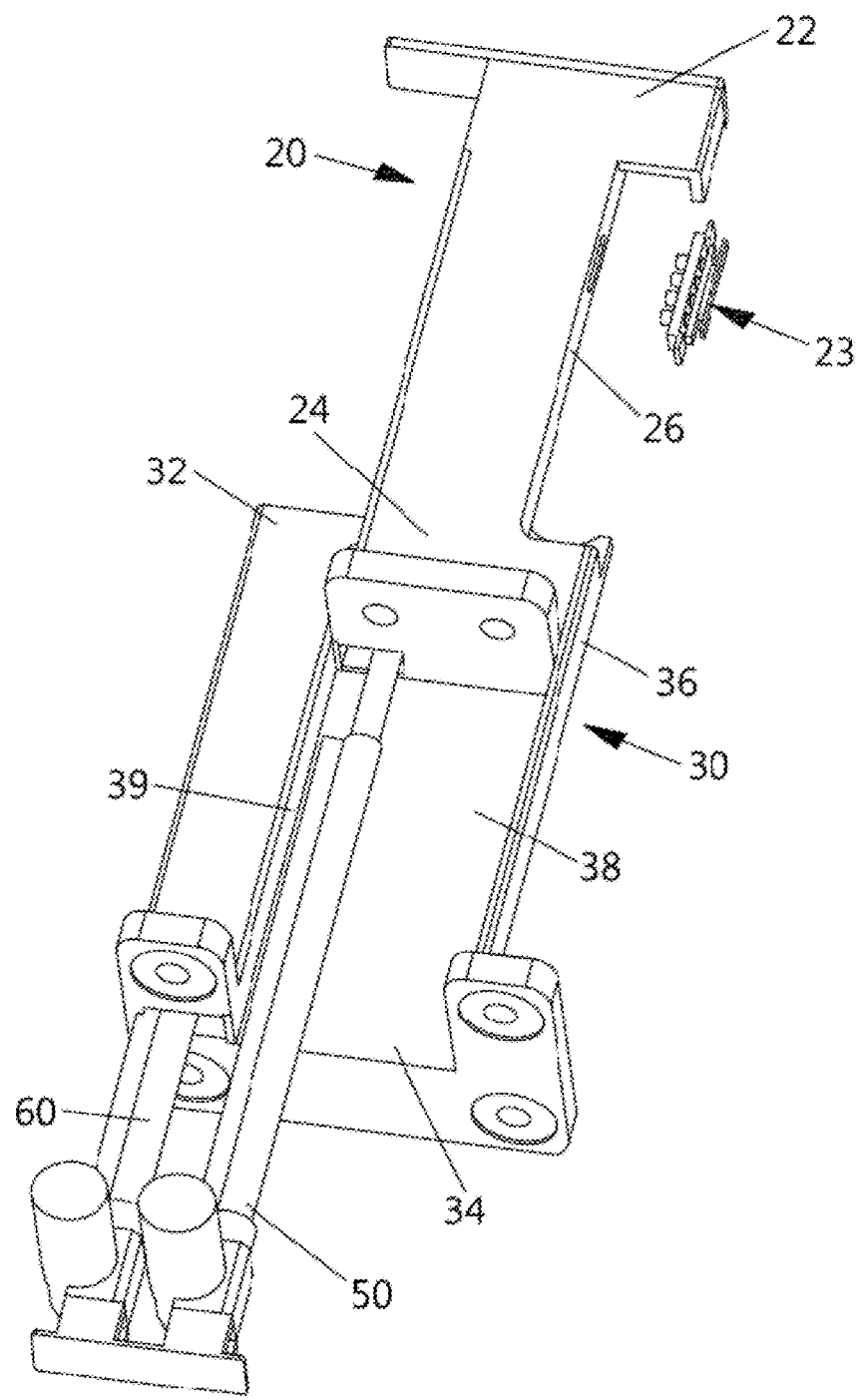
FIG. 9 is another schematic view of the second embodiment according to the invention, showing the spatial relationship between the primary and secondary lock parts.

As shown in FIG. 9, in a preferred embodiment, the side plate 38 is connected at one lateral side thereof to the rear plate 36 and connected at the other lateral side thereof with a guide plate 39 which is substantially parallel to the rear plate 36. Preferably, the guide plate 39 is configured to extend substantially parallel to the longitudinal direction (L) such that the rear plate 36, the side plate 38, and the guide plate 39 cooperatively define a guide groove extending along the longitudinal direction. The primary lock part 20 is configured as a rectangular bar which can be fitted in the guide groove such that the primary lock part 20 is slidable relative to the secondary lock part 30 along the longitudinal direction (L). The primary lock part 20 has a narrow segment disposed between the free end 22 and the restrained end 24 and formed with the front abutment surface 26, where the primary lock part 20 slidably abuts against the side plate 38 and the guide plate 39 without abutting against the rear plate 36. By virtue of such structure, the primary lock part 20 can be selectively brought to move slidably relative to the secondary lock part 30 along the longitudinal direction (L) to achieve an unlocked state in which the recess 40 is exposed so as to permit entry of the crank 90 into the recess 40, and the secondary lock part 30 and the primary lock part 20 can be further driven to move slidably relative to each other to achieve a locked state in which the recess 40 can accommodate the crank 90 and shield the first end 94 so that the crank 90 cannot be disengaged from the recess 40 and can be prevented from being detached from the crankshaft.

The reciprocating movement of the primary lock part 20 and the secondary lock part 30 along the longitudinal direction (L) can be implemented by manual or electrical control, preferably by electrical control. More preferably, the electrical control operation is programmed so that the entire process is automated. In the preferred embodiment shown in FIG. 9, the movements of the primary lock part 20 and the secondary lock part 30 are electrically driven by a primary lock part driving member 50 and a secondary lock part driving member 60, respectively. In this embodiment, the primary lock part driving member 50 and the secondary lock part driving member 60 respectively include an electric motor and a linear actuator member driven by the electric motor, which are disposed in the mounting frame 14 and are preferably connected to the restrained end 24 of the primary lock part 20 and the lower end 34 of the secondary lock part 30, respectively. The primary lock part driving member 50 and the secondary lock part driving member 60 transform rotary motion of the electric motors into linear motion of the linear actuator members, and utilize the extension and retraction strokes of the linear actuator members to control the distance of upward travel or downward travel of the primary lock part 20 and the secondary lock part 30. Those skilled in the relevant art will appreciate that the aforesaid linear actuator members are described herein for the purpose of illustration. Any type of driving member which can drive the reciprocating movement of the primary lock part 20 and the secondary lock part 30 and can control the distance of the upward or downward travel thereof falls within the scope of the invention, and the installation and operation thereof are also well known to those skilled in the relevant art. The automation of the primary lock part driving member 50 and the secondary lock part driving member 60 can be implemented by subjecting them to the control of a programmed micro-processor.

The primary lock part 20 is set to be drivable to move reciprocatingly along the longitudinal direction (L) to one of three positions. Specifically, when the primary lock part 20 is moved to a lowest point, it is disposed in a standby position, where the primary lock part 20 is entirely within the mounting frame 14 without projecting upwardly of the work surface 12. When the primary lock part 20 is moved upwardly to a highest point, it is disposed in the unlocked position, where the crank 90 is permitted to enter the recess 40 and the crank body 92 is permitted to abut against the front abutment surface 26. When the primary lock part 20 is moved downwardly from the unlocked position such that the first end portion 94 of the crank 90 is received by the abutment portion 42, the primary lock part 20 is disposed at the locked position. Therefore, the locked position of the primary lock part 20 depends on the position of the crank 90 on the bicycle and is not fixed. Preferably, the primary lock part 20 exerts a downward force on the first end portion 94 of the crank 90 when in the locked position thereof so as to force the wheels of the bicycle to rest tightly against the ground through the crank 90, thereby securing the wheels and the bicycle body firmly on the ground. In such case, it would be difficult for thieves to move the bicycle or remove parts and components of the bicycle.

Similarly, the secondary lock part 30 is set to be drivable to move reciprocatingly along the longitudinal direction (L) to be disposed in one of two positions. Specifically, the secondary lock part 30 is disposed in the standby position when moved downwardly to a low point. When the secondary lock part 30 is moved upwardly to a high point to be disposed in a position where the secondary lock part 30 holds the crank 90 in cooperation with the primary lock part 20, the secondary lock part 30 is disposed in the locked position thereof. Therefore, the locked position of the secondary lock part 30 depends on the position of the crank 90 on the bicycle and is not fixed.

Figure 10:
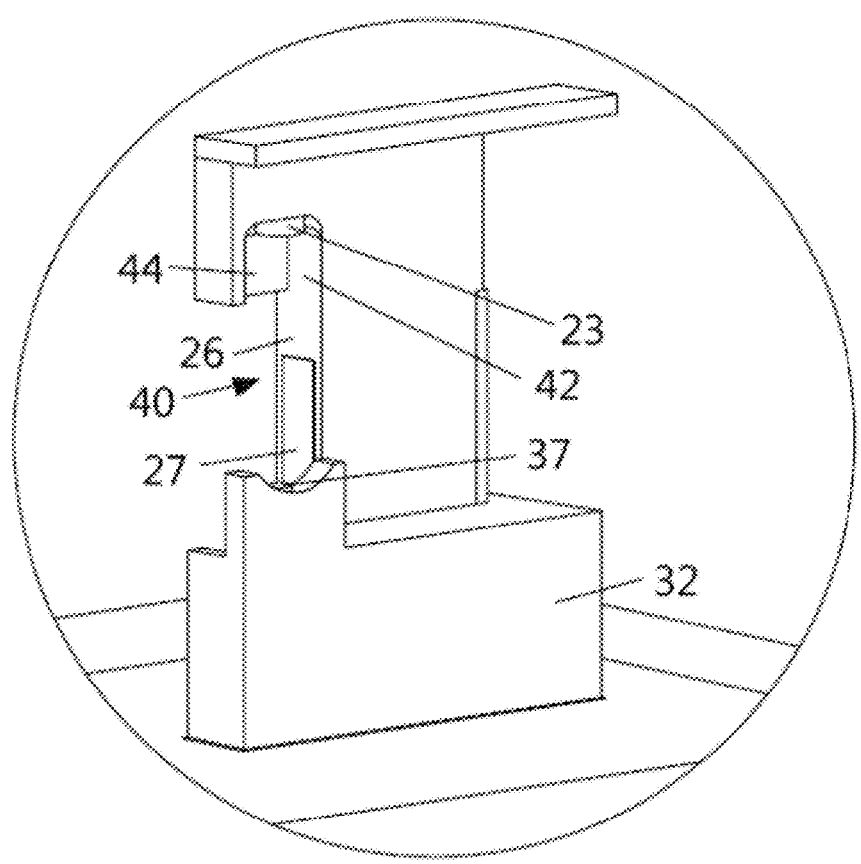
FIG. 10 is an enlarged view of an encircled portion A of FIG. 8, showing the positions of first, second, and third switches on the primary and secondary lock parts.

As mentioned hereinbefore, the switching of the primary lock part 20 and the secondary lock part 30 among the various positions can be implemented by manual or electrical control, more preferably by electrical control. In the preferred embodiment shown in FIG. 10, the primary lock part 20 is provided with a first switch 23 on the front abutment surface 26 thereof. When the crank body 92 of the crank 90 abuts against the front abutment surface 26, the first switch 23 is activated to cause the primary lock part 20 to be driven to move downwardly from the unlocked position to the locked position. In this preferred embodiment, the primary lock part 20 is provided with a second switch 27 on the abutment portion 42. When the first end portion 94 of the crank 90 abuts against the abutment portion 42, the second switch 27 is activated to cause the primary lock part 20 to stay in the locked position thereof and to cause the secondary lock part 30 to move upwardly. More preferably, the second switch 27 is provided with a pressure sensor for sensing the force exerted by the primary lock part 20 on the first end portion 94. When the force reaches a certain magnitude, for instance, when the force can cause the wheels of the bicycle to be brought by the crank 90 to rest tightly against the ground, the downward movement of the primary lock part 20 is caused to stop. In this preferred embodiment, the secondary lock part 30 is provided with a third switch 37 at the upper end 32 thereof, preferably in the groove 35. When the upper end 32 comes into contact with the crank 90 or the crankshaft as the secondary lock part 30 moves upwardly, the third switch 37 is activated to cause the secondary lock part 30 to stay in the locked position thereof. The first switch 23, the second switch 27, and the third switch 37 can each be a contact switch, such as a press switch as shown in FIG. 5, or a non-contact switch, such as an infrared switch. The first switch 23, the second switch 27, and the third switch 37 can activate or stop movement of the primary lock part 20 and the secondary lock part 30 by means of toggling of a switch circuit between ON and OFF. The arrangement of such switch circuit as well as the operation and downstream elements thereof are well known to those skilled in the relevant art.

Figure 11:
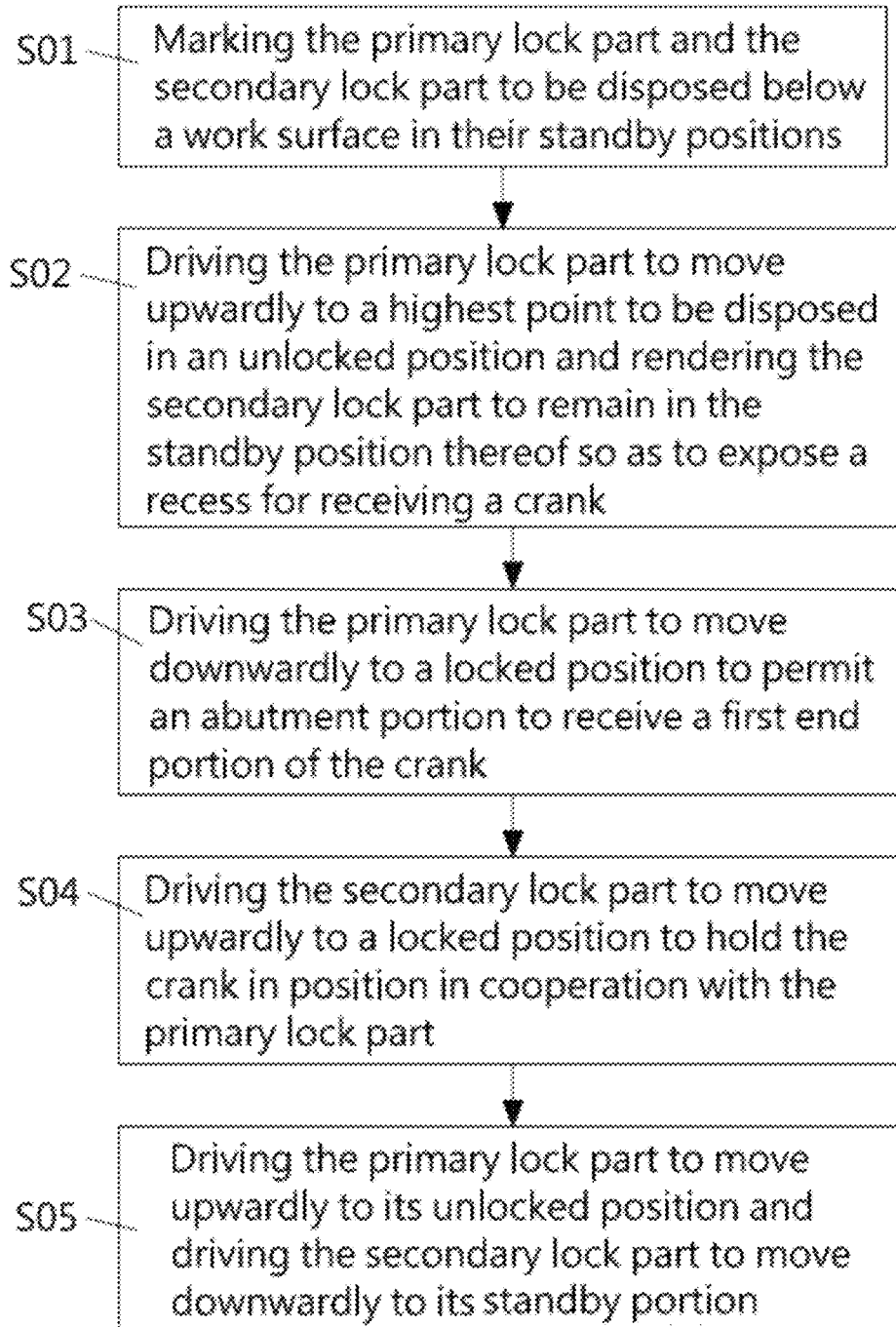
FIG. 11 is a flowchart illustrating the steps of locking a bicycle using the second embodiment of the bicycle parking lock apparatus according to the invention, and the subsequent unlocking steps.
Figure 12:
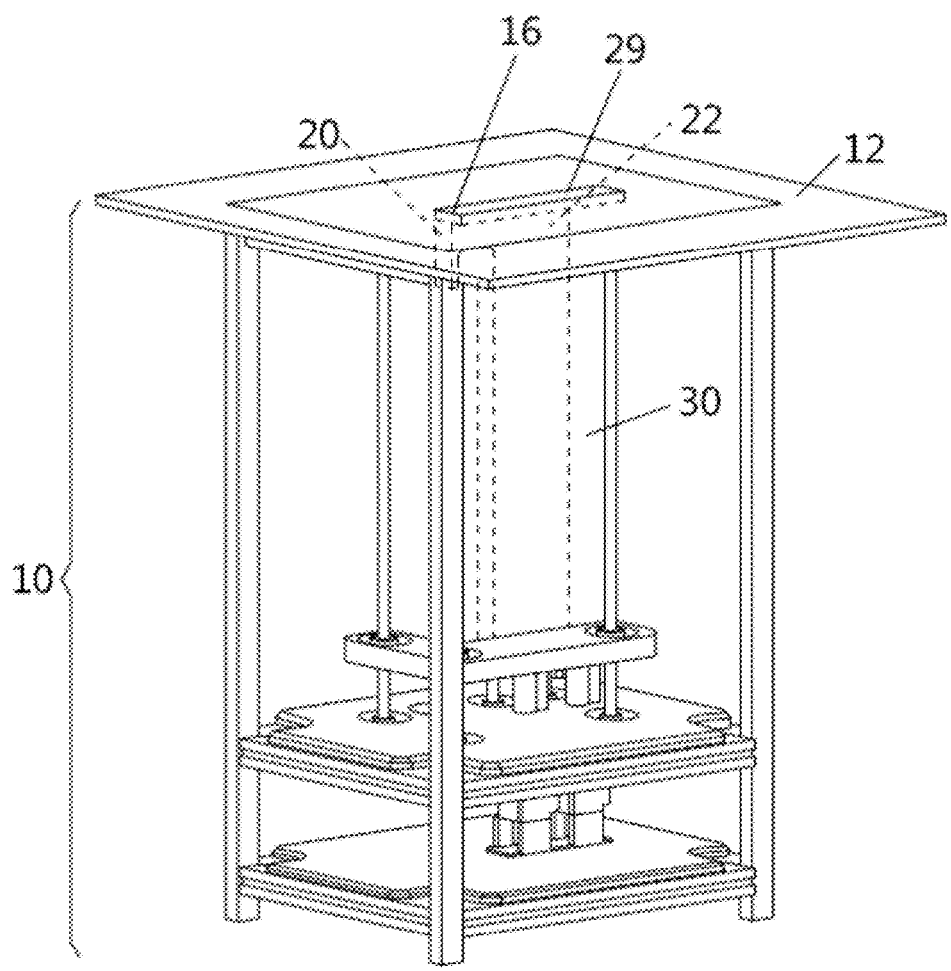
FIG. 12 is a schematic view showing the primary and secondary lock parts in standby positions.

The present invention also relates to a method for operating the bicycle parking lock apparatus disclosed herein to securely lock a bicycle. FIG. 11 is a flowchart illustrating the steps of operating the bicycle parking lock apparatus according to the invention to lock a bicycle, and the subsequent unlocking steps.

Reference is made to FIGS. 12 to 19 which illustrate the operation of the bicycle parking lock apparatus according to the second embodiment of the invention. Initially, the mount body 10 is embedded in the ground with the work surface 12 flush with the ground. As shown in step S01 of FIG. 11 and FIG. 12, the bicycle parking lock apparatus is in a standby state, in which the primary lock part 20 and the secondary lock part 30 are located below the work surface 12 and disposed in the standby positions thereof. Furthermore, the opening 16 of the work surface 12 is closed by the cover 29 disposed on the free end 22 of the primary lock part 20 to prevent entry of foreign objects into the mount body 10.

Figure 13:
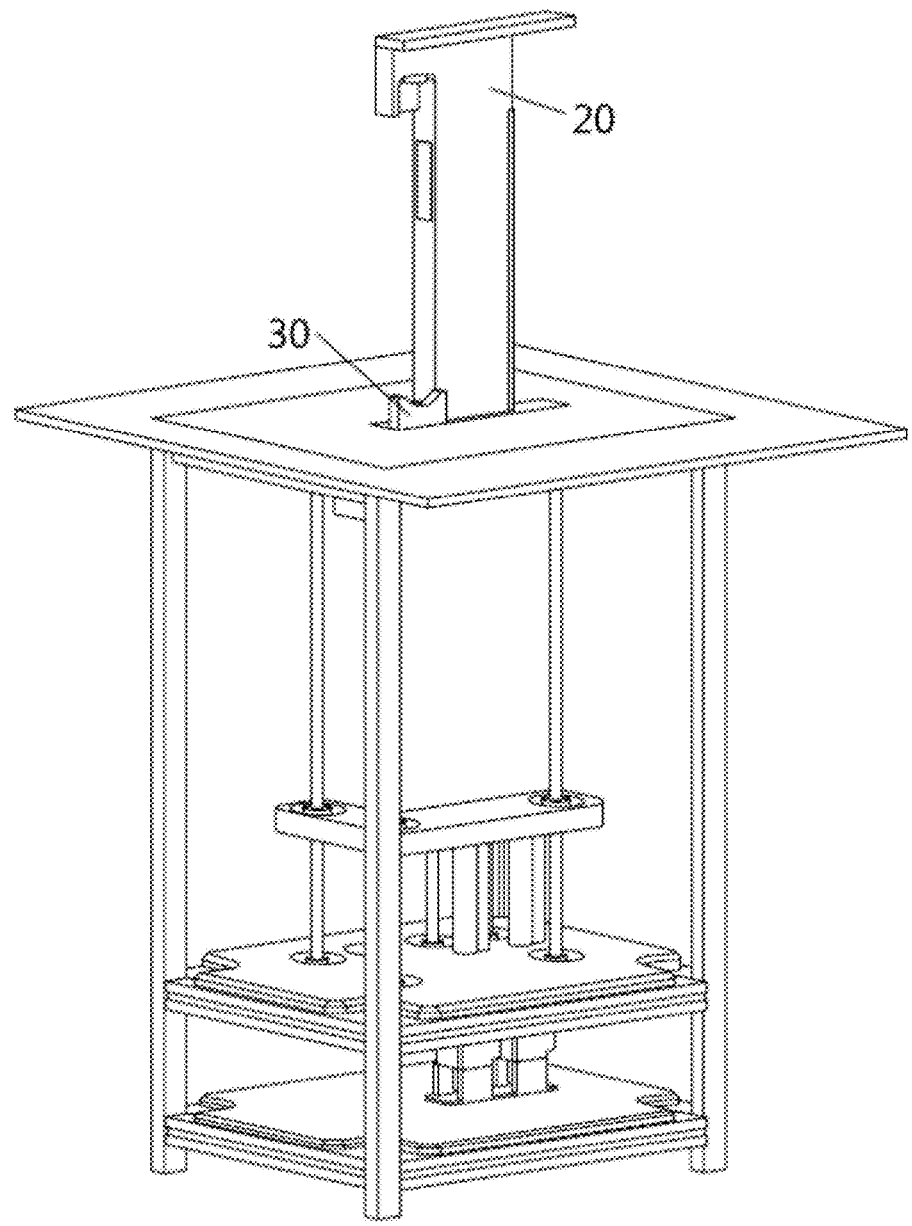
FIG. 13 is a schematic view showing that the primary lock part is in an unlocked position while the secondary lock part remains in the standby position.
Figure 14:
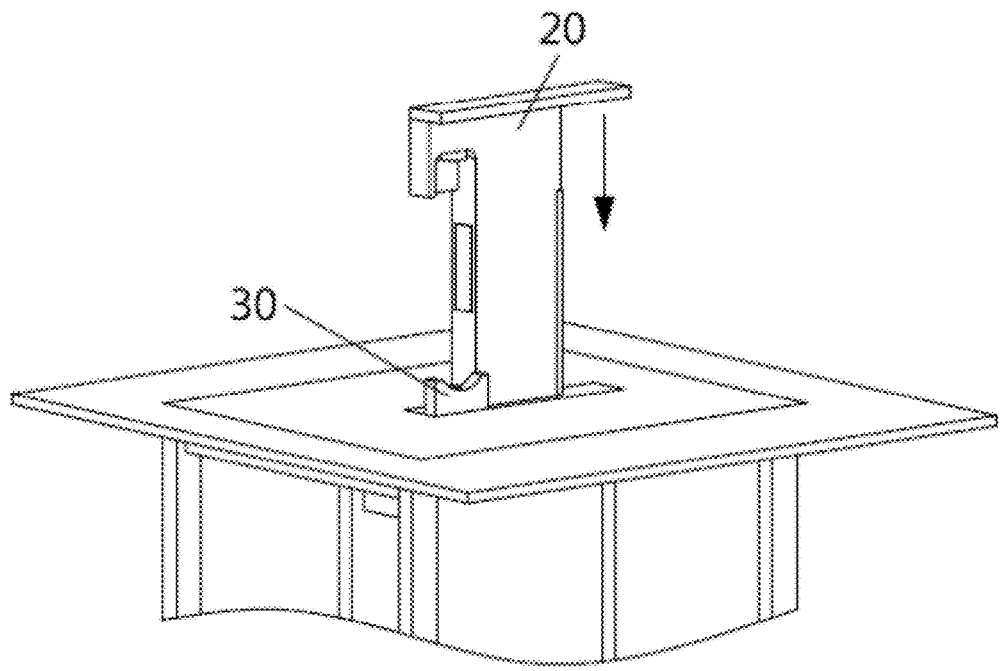
FIG. 14 is a schematic view showing that the primary lock part is in a locked position while the secondary lock part remains in the standby position.

As shown in step S02 of FIG. 11 and FIG. 13, the primary lock part 20 is rendered to move upwardly to the highest point to be disposed in the unlocked position thereof, and the secondary lock part 30 is rendered to remain in the standby position thereof such that the recess 40 is exposed to permit entry of the crank 90 into the recess 40. In commercial applications, such process can be initiated by pressing an actuation key or button, inputting a specific number, scanning a barcode, inserting a specific amount of money, deducting points corresponding to a specific amount of money from a magnetic card, etc.

Subsequently, the user can adjust the crank 90 and the pedal of the bicycle to a low position so that the crank 90 is substantially parallel to the front abutment surface 26. Next, the bicycle is pushed so that at least a part of the crank 90 abuts against the front abutment surface 26. Thereafter, as shown in step S03 of FIG. 11 and FIG. 14, the primary lock part 20 is rendered to move downwardly to the locked position to permit the first end portion 94 of the crank 90 to be received by the abutment portion 42. Preferably, when the primary lock part 20 is disposed in the locked position, a downward force exerted thereby on the first end portion 94 of the crank 90 forces the wheels of the bicycle to be brought by the crank 90 to rest tightly against the ground. As mentioned hereinabove, in a preferred embodiment of the invention, the downward movement of the primary lock part 20 can be actuated by activating the first switch 23, and activating the second switch 27 can cause the primary lock part 20 to be positioned in the locked position.

Figure 15:
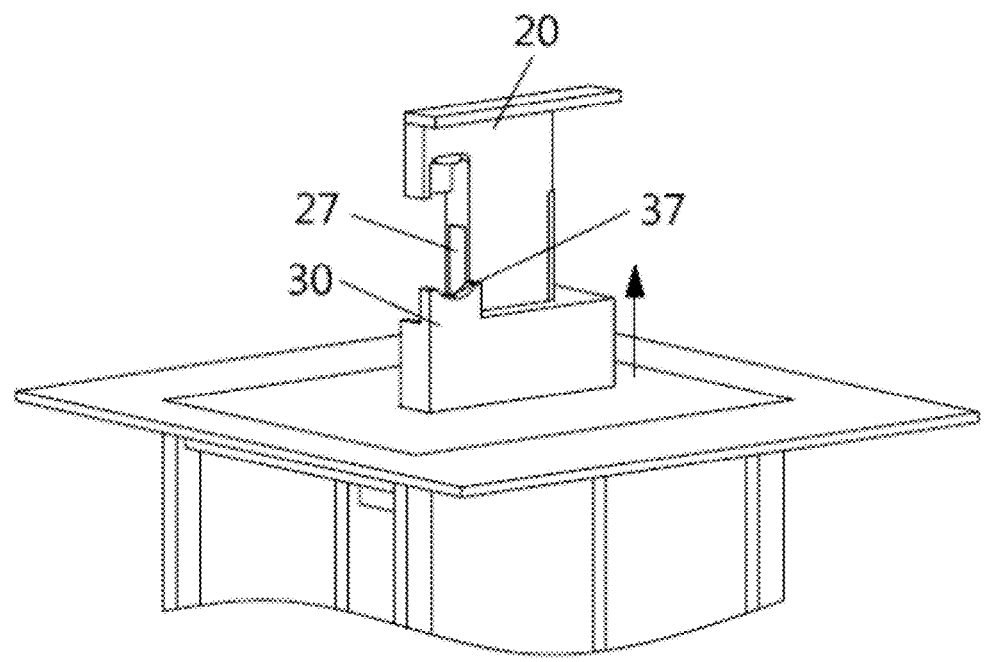
FIG. 15 is a schematic view showing that the primary lock part is in the locked position thereof while the secondary lock part moves upwardly from the standby position thereof.
Figure 16:
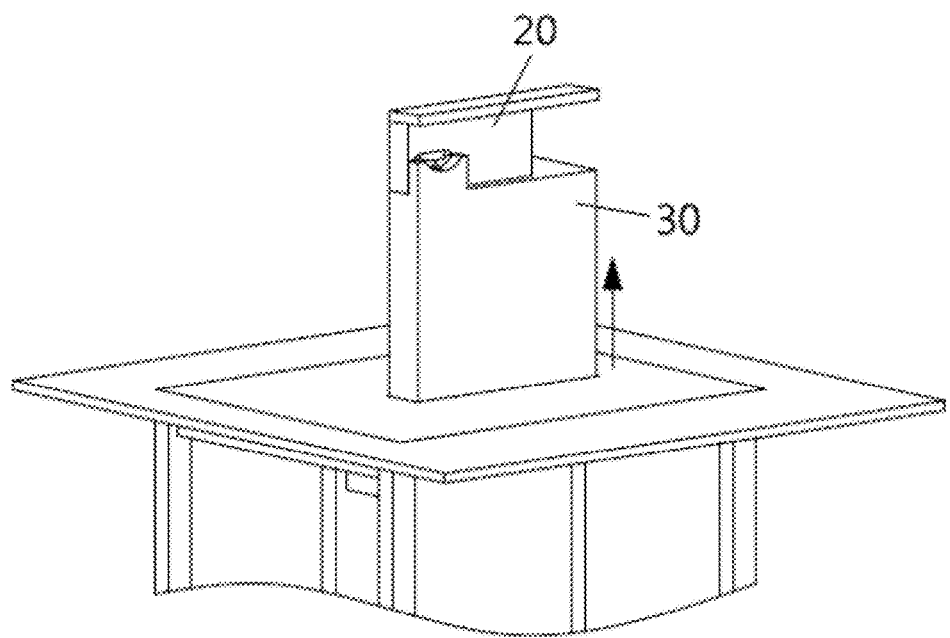
FIG. 16 is a schematic view showing the primary and secondary lock parts in the locked positions thereof.
Figure 17:
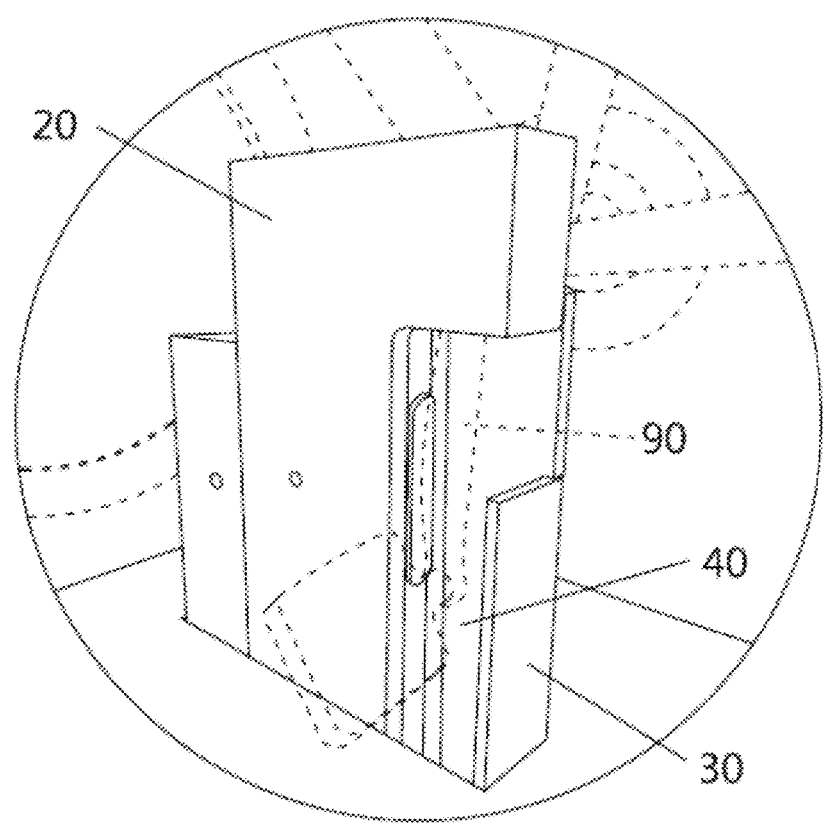
FIG. 17 is a schematic view showing the positions of the primary and secondary lock parts in the locked positions thereof relative to the crank.
Figure 18:
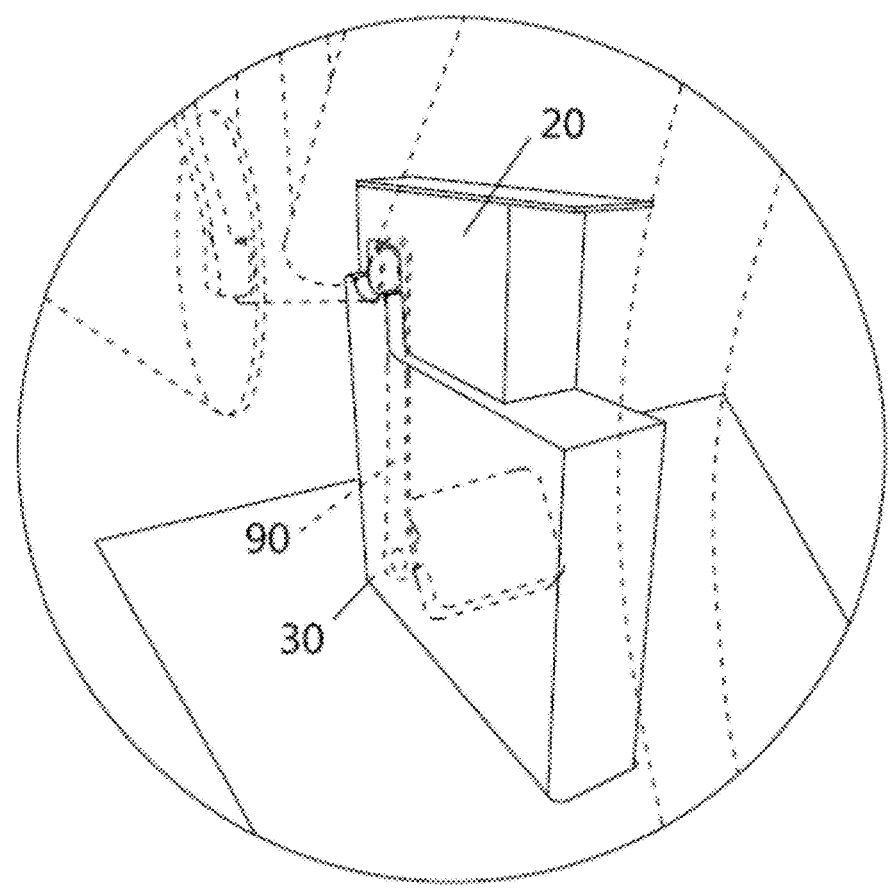
FIG. 18 is another schematic view showing the positions of the primary and secondary lock parts in the locked positions thereof relative to the crank.

As shown in step S04 of FIG. 11 and FIGS. 15 and 16, the secondary lock part 30 is rendered to move upwardly to the locked position thereof to hold the crank 90 in position in cooperation with the primary lock part 20. As mentioned hereinabove, in a preferred embodiment of the invention, the upward movement of the secondary lock part 30 may be actuated by activating the second switch 27, and activating the third switch 37 can cause the secondary lock part 30 to be positioned in the locked position. In such state, the crank 90 is securely locked by the bicycle parking lock apparatus according to the invention, and is also protected thereby against disengagement from the recess 40 or detachment from the crankshaft. This means that the entire frame of the bicycle is fixed so that the bicycle cannot be removed at will. FIGS. 17 and 18 show the positions of the primary lock part 20 and the secondary lock part 30 relative to the crank 90 in the locked state.

Figure 19:
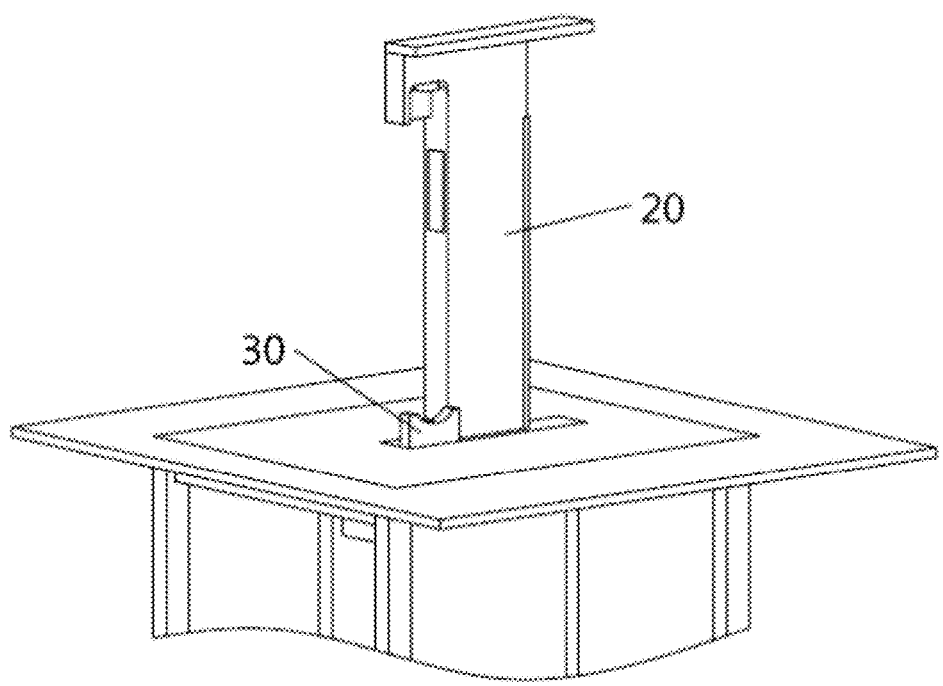
FIG. 19 is a schematic view showing that the primary lock part returns to the unlocked position thereof while the secondary lock part returns to the standby position thereof.

As shown in step S05 of FIG. 11 and FIG. 19, by driving the primary lock part 20 to move upwardly to the unlocked position thereof and driving the secondary lock part 30 to move downwardly to the standby position thereof, the bicycle parking lock apparatus according to the invention can be unlocked. In commercial applications, such unlocking process can be initiated by pressing an actuation key or button, inputting a specific number, scanning a barcode, inserting a specific amount of money, deducting points corresponding to a specific amount of money from a magnetic card, etc. At this time, the user can freely remove the bicycle from the bicycle parking lock apparatus. Thereafter, the primary lock part 20 can be rendered to return to the standby position thereof so that the bicycle parking lock apparatus returns to the standby state shown in step S01 of FIG. 11 and FIG. 12.

The bicycle parking lock apparatus according to the invention is suitable for installation near scenic spots, shopping and food centers, schools, government agencies, office buildings, public transportation stations or stops, etc., to provide bicycle parking for citizens and tourists. The bicycle parking lock apparatus is also suitable for unmanned public bicycle rental services which provide short-term rental of bicycles. Particularly, the bicycle parking lock apparatus is adapted for locking the existing crank structure of the bicycle, without requiring any modification to the bicycle or installation of any additional lock component on the bicycle. By locking the crank of the bicycle to secure the entire bicycle to prevent unauthorized removal of the bicycle, the invention ensures reliable and safe bicycle parking and locking, thereby encouraging utilization of bicycles as a form of transportation and meeting market demands.

In particular, the bicycle parking lock apparatus according to the present invention is simple in structure and easy to manufacture and operate. When not in use, the entire bicycle parking lock apparatus can be concealed underground to save space while preventing undesirable impact on the apparatus by external objects or corrosion by environmental factors, thereby prolonging the service life of the apparatus.

While the present invention has been described in detail herein, various modifications or changes within the spirit and scope of the present invention will be apparent to those skilled in the art. In view of the above disclosure, knowledge in the relevant art and the entire contents of documents discussed in the background and detailed description sections above are incorporated herein in their entirety for reference.

What is claimed is:

1. A bicycle parking lock apparatus adapted for locking a crank of a bicycle, the crank including a crank body, a first end portion connected to a crankshaft, and a second end portion connected to a pedal such that the crank has, relative to a bicycle frame of the bicycle, an inboard side facing the bicycle frame, and an outboard side distal from the bicycle frame, said parking lock apparatus comprising:
    a primary lock part having a free end, a restrained end opposite to said free end, and a recess distal from said restrained end and adapted to receive the crank, wherein said recess is provided with a sidewall such that when the crank is received in said recess, the outboard side of the crank at the first end portion is shielded by said sidewall; and
    a secondary lock part configured to be movable reciprocatingly relative to said primary lock part to be disposed in a standby position or a locked position, wherein when said secondary lock part is driven to be disposed in the locked position thereof, said secondary lock part is adapted to hold the crank in position in cooperation with said primary lock part;
    wherein said secondary lock part is configured to be movable reciprocatingly along a direction substantially parallel to said sidewall, and is spaced apart from said sidewall by a distance sufficient to accommodate the crank between said secondary lock part and said sidewall such that when the crank is received in said recess, said secondary lock part is adapted to hold the crank body of the crank in position.

2. The bicycle parking lock apparatus according to claim 1, wherein said secondary lock part is disposed on said primary lock part such that said secondary lock part is arranged substantially parallel to and opposite to the sidewall with respect to said recess, and is spaced apart from said sidewall by a horizontal distance sufficient to accommodate the crank.

3. The bicycle parking lock apparatus according to claim 1, further comprising a mount body, which has a work surface and a mounting frame connected below said work surface, wherein:

said primary lock part is slidably disposed on said mounting frame through said restrained end such that said primary lock part is movable reciprocatingly along a longitudinal direction substantially perpendicular to said work surface, and said primary lock part includes a front abutment surface distal from said restrained end and adapted to be abutted against by the crank body of the crank, and an extension arm extending from said front abutment surface to define said recess in cooperation with said front abutment surface, said extension arm formed with an abutment portion facing downwards and adapted to receive the first end portion of the crank; and said secondary lock part is configured as a plate body and is disposed on said mounting frame in such a manner as to be movable reciprocatingly along the longitudinal direction, said secondary lock part being formed with a rear plate opposite to said front abutment surface, and a side plate connected substantially perpendicularly to said rear plate such that said rear plate and said side plate which are formed on said secondary lock part are adapted to hold the crank in position in cooperation with said recess of said primary lock part.

4. The bicycle parking lock apparatus according to claim 3, wherein said side plate of said secondary lock part is formed with a guide plate at an opposite lateral edge opposite to a lateral edge where said side plate is connected to said rear plate, said guide plate being substantially parallel to said rear plate such that said rear plate, said side plate, and said guide plate cooperatively define a guide groove, said primary lock part being fitted in said guide groove such that said primary lock part is slidable along the longitudinal direction relative to said secondary lock part.

5. The bicycle parking lock apparatus according to claim 4, further comprising a primary lock part driving member and a secondary lock part driving member which are disposed in said mounting frame, wherein said primary lock part driving member and said secondary lock part driving member are respectively connected to said primary lock part and said secondary lock part to respectively drive said primary lock part and said secondary lock part to move along the longitudinal direction.

6. The bicycle parking lock apparatus according to claim 5, wherein said primary lock part driving member and said secondary lock part driving member respectively include an electric motor and a linear actuator member driven by said electric motor.

7. The bicycle parking lock apparatus according to claim 5, wherein said primary lock part is configured to be drivable to move along the longitudinal direction to be disposed in one of a standby position, an unlocked position, and a locked position such that: when said primary lock part is in the standby position thereof, said primary lock part is disposed at a lowest point without projecting upwardly of said work surface; when said primary lock part is in the unlocked position thereof, said primary lock part is disposed at a highest point to enable said abutment portion and said front abutment surface to permit the crank body of the crank to be brought close thereto; and when said primary lock part is in the locked position thereof, the first end portion of the crank is received by said abutment portion, and wherein said secondary lock part is configured to be drivable to move along the longitudinal direction to be disposed in one of the standby position thereof and the locked position thereof such that when said secondary lock part is in the standby position thereof, said secondary lock part is disposed at a low point without substantially projecting upwardly of said work surface, and when said secondary lock part is in the locked position thereof, said secondary lock part is disposed at a high point to hold the crank in position in cooperation with said primary lock part.

8. The bicycle parking lock apparatus according to claim 7, wherein said front abutment surface has a first switch disposed thereon such that when said first switch is activated, said primary lock part is driven to start moving downwardly from the unlocked position thereof, wherein said abutment portion has a second switch disposed thereon such that when said second switch is activated, said primary lock part stops moving downwardly while said secondary lock part is driven to start moving upwardly from the standby position thereof, and wherein said secondary lock part has a third switch disposed on an upper end thereof such that when said third switch is activated, said secondary lock part stops moving upwardly.

9. The bicycle parking lock apparatus according to claim 8, wherein said second switch is provided with a pressure sensor for sensing a force exerted by said primary lock part on the first end portion of the crank such that when said pressure sensor senses that the force reaches a predetermined magnitude, said second switch is activated to cause said primary lock part to stop moving downwardly.

\* \* \* \* \*